US010382201B1

(12) United States Patent
Allo et al.

(10) Patent No.: US 10,382,201 B1
(45) Date of Patent: *Aug. 13, 2019

(54) REMOVABLE CIRCUIT FOR UNLOCKING SELF-ENCRYPTING DATA STORAGE DEVICES

(71) Applicant: Seagate Technology LLC, Cupertino, CA (US)

(72) Inventors: Christopher Nicholas Allo, Lyons, CO (US); Saheb Biswas, Jharkhand (IN); Kevin Gautam Sternberg, Littleton, CO (US)

(73) Assignee: Seagate Technology LLC, Cupertino, CA (US)

( * ) Notice: Subject to any disclaimer, the term of this patent is extended or adjusted under 35 U.S.C. 154(b) by 218 days.

This patent is subject to a terminal disclaimer.

(21) Appl. No.: 15/214,965

(22) Filed: Jul. 20, 2016

Related U.S. Application Data

(63) Continuation-in-part of application No. 14/862,128, filed on Sep. 22, 2015, now Pat. No. 9,768,952.

(51) Int. Cl.
| | |
|---|---|
| *H04L 29/06* | (2006.01) |
| *H04L 9/08* | (2006.01) |
| *H04L 9/32* | (2006.01) |
| *G06F 21/80* | (2013.01) |
| *G06F 9/4401* | (2018.01) |

(52) U.S. Cl.
CPC .......... *H04L 9/0897* (2013.01); *G06F 9/4406* (2013.01); *G06F 21/80* (2013.01); *H04L 9/3263* (2013.01); *H04L 63/062* (2013.01); *H04L 63/0823* (2013.01); *H04L 2209/24* (2013.01)

(58) Field of Classification Search
CPC ....... G06F 21/80; H04L 9/083; H04L 9/0897; H04L 9/4406; H04L 9/3263; H04L 63/0823; H04L 63/062; H04L 2209/24
See application file for complete search history.

(56) References Cited

U.S. PATENT DOCUMENTS

| | | | |
|---|---|---|---|
| 6,950,523 B1 | 9/2005 | Brickell et al. | |
| 7,752,463 B2 * | 7/2010 | Hahn | G06F 21/73 380/277 |
| 7,877,603 B2 | 1/2011 | Goodman et al. | |

(Continued)

OTHER PUBLICATIONS

Bradley, Ryan and Angelo Parisi. "Centrally Managing Access to Self-Encrypting Drives in Lenovo System x Servers", Mar. 2015. (Year: 2015).*

(Continued)

*Primary Examiner* — Michael Simitoski
(74) *Attorney, Agent, or Firm* — Cesari & Reed LLP; Kirk A. Cesari (57) ABSTRACT

Security of data storage devices and servers can be improved by the system and methods described herein. In some embodiments, a key management device of a server can be a locally (or virtually) located data storage device such as a HDD or SDD. The key management device may be part of a server system and can have a secure area protected by a cryptographic module (e.g. hardware integrated circuit). The secure area can store a certificate needed to authenticate another data storage device coupled to the server. A second server may authenticate the certificate and provide the access key to the another data storage device.

17 Claims, 8 Drawing Sheets

(56) References Cited

U.S. PATENT DOCUMENTS

| | | | |
|---|---|---|---|
| 7,953,978 B2 | 5/2011 | Greco et al. | |
| 8,254,577 B2 | 8/2012 | Almoustafa et al. | |
| 8,295,490 B1* | 10/2012 | McCoy | H04L 9/0894 |
| | | | 380/279 |
| 8,300,831 B2 | 10/2012 | Kahler et al. | |
| 8,474,698 B1* | 7/2013 | Billett | G06F 21/57 |
| | | | 235/379 |
| 8,494,170 B2 | 7/2013 | Kahler et al. | |
| 8,995,654 B2 | 3/2015 | Tang et al. | |
| 9,756,033 B2* | 9/2017 | Isozaki | H04L 63/08 |
| 2003/0041250 A1* | 2/2003 | Proudler | G06F 21/57 |
| | | | 713/182 |
| 2008/0065903 A1* | 3/2008 | Goodman | G06F 21/6218 |
| | | | 713/193 |
| 2008/0147892 A1* | 6/2008 | Carlson | G06F 13/385 |
| | | | 710/5 |
| 2011/0258456 A1* | 10/2011 | Lyakhovitskiy | G06F 21/78 |
| | | | 713/189 |
| 2011/0261964 A1* | 10/2011 | Kahler | H04L 9/0825 |
| | | | 380/286 |
| 2012/0099728 A1* | 4/2012 | Rich | H04L 63/06 |
| | | | 380/277 |
| 2012/0239943 A1* | 9/2012 | Okamoto | G06F 21/6218 |
| | | | 713/193 |
| 2013/0024679 A1* | 1/2013 | Isozaki | G06F 21/31 |
| | | | 713/2 |
| 2013/0067242 A1* | 3/2013 | Lyakhovitskiy | G06F 21/00 |
| | | | 713/193 |
| 2013/0232584 A1* | 9/2013 | Baentsch | G06F 21/10 |
| | | | 726/29 |
| 2014/0161251 A1* | 6/2014 | Yoshida | H04L 9/0825 |
| | | | 380/44 |
| 2014/0237569 A1* | 8/2014 | Zhao | G06F 21/34 |
| | | | 726/6 |
| 2015/0006910 A1* | 1/2015 | Shapiro | G06F 12/1408 |
| | | | 713/190 |
| 2015/0121028 A1* | 4/2015 | Gupta | G06F 12/1466 |
| | | | 711/164 |
| 2016/0191481 A1* | 6/2016 | Zimmer | H04L 63/0428 |
| | | | 713/168 |
| 2017/0012770 A1* | 1/2017 | Lin | G06F 21/572 |
| 2017/0076096 A1* | 3/2017 | Challener | G06F 21/53 |
| 2017/0083457 A1* | 3/2017 | Khemani | G06F 12/1408 |
| 2017/0085374 A1* | 3/2017 | Chen | H04L 9/0827 |
| 2017/0244698 A1* | 8/2017 | Gale | H04L 63/0853 |

OTHER PUBLICATIONS

Oasis. "Key Management Interoperability Protocol (KMIP)", May 2009. (Year: 2009).*

Opal. "TCG Storage Security Subsystem Class: Opal", Aug. 2015. (Year: 2015).*

Ouellet, Seagale Secure Self-Encrypting Drives with LSI MegaRAID SafeStore Encryption Services for Sewers, Producl Brief, LSI, San Jose, CA, 2013, 3 pages. file:///C:/Users/CR%20Docket/Downloads/LSI-PB-Seagate-SED-SafeStore.pdf.

Ouellet, Seagate Secure Self-Encrypting Drives with LSI MegaRAID SafeStore Encryption Services for Servers, Product Brief, LSI, San Jose, CA, 2013, 3 pages. file:///C:/Users/CR%20Docket/Downloads/LSI-PB-Seagate-SED-SafeStore.pdf.

* cited by examiner

REMOVABLE CIRCUIT FOR UNLOCKING SELF-ENCRYPTING DATA STORAGE DEVICES

CROSS REFERENCE TO RELATED APPLICATIONS

The present application is a continuation-in-part of and claims priority to pending U.S. patent application Ser. No. 14/862,128, filed Sep. 22, 2015, entitled "REMOVABLE CIRCUIT FOR UNLOCKING SELF-ENCRYPTING DATA STORAGE DEVICES", the contents of which is hereby incorporated by reference in its entirety.

SUMMARY

In some embodiments, an apparatus can comprise a data storage device configured to connect to be removable from a first server. An operating system stored locally in the data storage device can be loaded into the memory of the first server, the operating system configured to transmit, from the first server to a second server, a request for a key corresponding to an encrypted data storage device ("DSD"), the request including an authentication certificate. The operating system also configured to receive the key from the second server, and unlock a secure storage area of the DSD with the encrypted key.

In some embodiments, a system can include a data storage device configured to be connectable and removable from a first server. The data storage device can include: an interface circuit, a secure nonvolatile data storage area, a memory storing a key management operating system, and a controller. The controller can be configured to load the key management operating system into the memory of the first server. The key management operating system can be configured to: access a hardware encryption circuit of the first server; obtain access to the secure nonvolatile data storage area of the data storage device via the hardware encryption circuit, retrieve an authentication certificate from the secure nonvolatile data storage area when access is granted to the key management operating system, transmit, from the first server to a second server, a request for a key corresponding to an encrypted data storage device ("DSD") connected to the first server where the request includes the authentication certificate, receive the key from the second server, and unlock the encrypted DSD with the key.

In some embodiments, a memory device can store instructions that when executed cause a processor to perform a method. The method may include: accessing a hardware encryption circuit of a first server; obtaining access to a secure nonvolatile data storage area of a first data storage device via the hardware encryption circuit; retrieving an authentication certificate from the secure nonvolatile data storage area when access is granted; transmitting, from the first server to a second server, a request for a key corresponding to a second data storage device connected to the first server, the request including the authentication certificate; receiving the key from the second server; and unlocking the second data storage device with the key.

DETAILED DESCRIPTION

In the following detailed description of the embodiments, reference is made to the accompanying drawings which form a part hereof, and in which are shown by way of illustrations. Features of the various described embodiments may be combined, other embodiments may be utilized, and structural changes may be made without departing from the scope of the present disclosure. Features of the various embodiments and examples described herein may be combined, exchanged, removed, other embodiments utilized, and structural changes made without departing from the scope of the present disclosure.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

In accordance with various embodiments, the methods and functions described herein may be implemented as one or more software programs running on a computer processor or controller. In accordance with various embodiments, the methods and functions described herein may be implemented as one or more software programs running on a computing device, such as a server, a data storage device (e.g. a solid state drive, a hard drive, a hybrid drive), or a combination thereof. Dedicated hardware implementations including, but not limited to, application specific integrated circuits, programmable logic arrays, and other hardware devices can likewise be constructed to implement the methods and functions described herein. Further, the methods and functions described herein may be implemented as a device, such as a computer readable storage medium or memory device, including instructions that when executed cause a processor to perform the methods.

Figure 1:
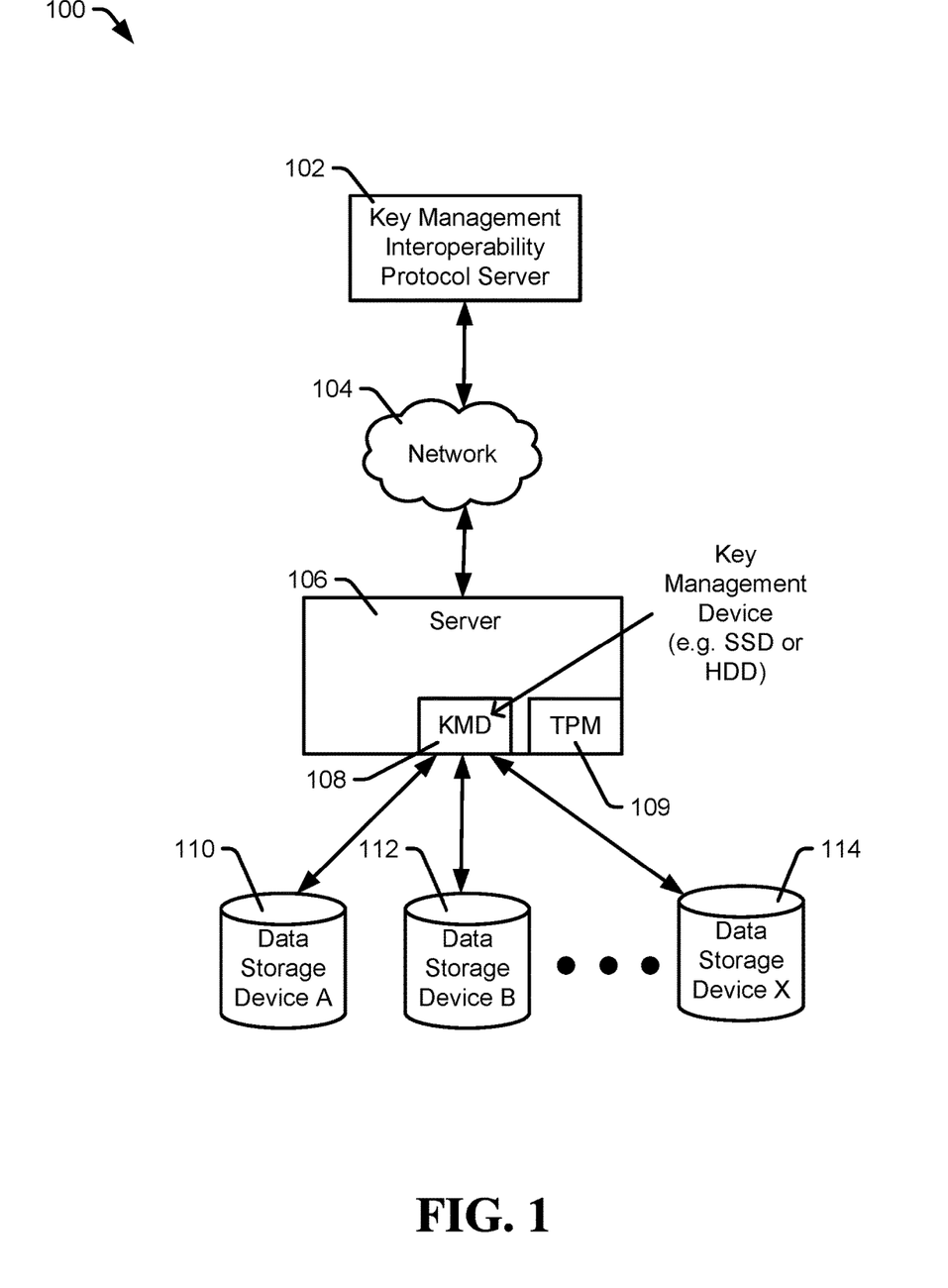
FIG. 1 is a diagram of a system of a removable circuit for unlocking self-encrypting data storage devices, in accordance with certain embodiments of the present disclosure.

Referring to FIG. 1, certain embodiments of a system of a removable circuit for unlocking self-encrypting data storage devices are shown and generally designated 100. System 100 can include a key management interoperability protocol ("KMIP") server 102 coupled to a server 106 via a network 104, which may be a wired or wireless network and may be any type of network. The server 106 may be a data server, file system server, metadata server, web server, application server, network attached storage (NAS), or other server. In some embodiments, the server 106 may include a redundant array of independent discs ("RAID") server. The server 106 may include a key management device ("KMD") 108, and may be coupled to one or more data storage devices ("DSDs"), such as DSDs A 110, B 112, and X 114. Further, the server 106 may include a trusted platform module ("TPM") 109 that can implement security protocols. The TPM 109 may be implemented as software, hardware, or a combination thereof such as security controller implementing firmware. In some embodiments, the TPM 109 may be a secure cryptographic integrated circuit ("IC") that is configured to manage user authentication, network access, data protection, or a combination thereof.

The DSDs A 110, B 112, and X 114, may be self-encrypting drives ("SEDs") and can be a solid-state drive ("SSD"), a hard disc drive ("HDD"), a hybrid drive, or a combination thereof. SEDs may encrypt data by itself, such as before data is stored to a storage medium (e.g. magnetic discs or flash memory) and decrypt the data as the data is retrieved from the storage medium. An SED may encrypt data with an internally stored encryption key that is not accessible outside of the SED, and may further decrypt encrypted data with a corresponding decryption key. In some examples, an SED's encryption key may be a symmetric key used by an SED's encryption engine to encrypt plaintext (i.e. data in transit) into cipher text (i.e. encrypted data) when the data is stored to the SEDs and to decrypt cipher text into plain text when data is read from the SEDs.

An SED may be said to be unlocked when a correct symmetric key (or other key combinations) has been provided, thus allowing the encrypted data to be decrypted. An SED may be said to be locked when the data remains encrypted and a correct symmetric key (or other key combinations) has not been provided. In some cases, an SED can become locked when power is removed to prevent an unauthorized person from taking the SED and accessing the data. In order to gain access to the encrypted data when power is restored, a correct access key must be provided to the SED. In some embodiments, the access key(s) may be encrypted and stored remotely on the KMIP server 102.

In some embodiments, the KMD 108 may be a removable storage device, such as a HDD, SSD, or hybrid drive, which may also be an SED. The KMD 108 may include a secure storage area configured or reserved to store unique identification keys for each of the DSDs A 110, B 112, and X 114. The server 106 may provide secure access to the reserved storage area of the KMD 108 via utilizing the security protocols of the TPM 109. For example, the KMD 108 may not be able to access data (e.g. the KMIP authentication keys) in the secure reserved storage area until the TPM 109 provides the proper access key to the KMD 108.

Once the KMD 108 has access to the reserved storage area, the KMD 108 (e.g. via the server 106) may transmit a request to the KMIP server 102 for encrypted keys corresponding to DSDs A 110, B 112, and X 114 or corresponding to bands thereof. The request may include certificates (e.g. KMIP authentication keys), retrieved from the reserved storage area, that uniquely identify the drive(s) or band(s) that the server 106 wants to unlock. The KMIP server 102 can then reply with the corresponding encrypted keys. Once the KMD 108 receives the encrypted key(s), it may unlock the DSDs A 110, B 112, and X 114. For example, once DSD A is unlocked, thus giving the server 106 access to data in DSD A, the KMD 108 may delete the locally stored version of the encrypted key used to access DSD A.

In some examples, the KMD 108 may determine if there are any unregistered SEDs coupled to the server 106. Unregistered SEDs may be SEDs for which no encrypted key is stored in the KMIP server 102. For example, if another DSD is coupled to the server 106, that DSD may be said to be unregistered if the KMIP server 102 does not already have an encrypted key associated with the newly coupled DSD. To register unregistered DSDs, the KMD 108 may obtain a unique identifier for the unregistered DSDs, and provide the unique identifier and a request for a security identification ("ID") corresponding to the unique identifier to the KMIP server 102. The KMIP server 102 can create the security ID and a corresponding encrypted key. The encrypted key can be stored on the KMIP server 102, and the KMIP server 102 may provide the security ID and the encrypted key to the KMD 108. The KMD 108 can lock the SED with the encrypted key. The security ID may be stored to the secure storage area of the KMD 108, which the security ID may be part of a certificate (e.g. authentication key) that includes the security ID, and the storage area be secured by the TPM 109. The KMD 108 may then delete the local version of the encrypted key that was used to lock the corresponding SED. From that point on, the SED may be unlocked with the encrypted key stored in the KMIP 102, via the processes described herein.

In some embodiments, the KMD 108 may connect to be removable from the server 106 by physically and electrically connecting and disconnecting the KMD 108 to the server 106 without physically modifying the server 106. For example, the KMD 108 may be a data storage device that can connect via an interface to the server's 106 motherboard without physically modifying (e.g. moving, partially or wholly disassembling, disconnecting, etc.) components (e.g. mother board, graphics cards, processors, memory modules, expansion boards, DSDs, network adapters, power connectors, etc.) in the server 106. For example, to install the KMD 108 in the server 106, a user can simply select an available data storage device interface connection in a motherboard, attach a cable (if needed) with the connectors to the KMD 108 and to the motherboard. In some cases, connecting and disconnecting the KMD 108 in this manner can be accomplished without physically modifying the server 106. In some examples, the KMD 108 may be connected to other circuits in the server, such as an expansion card or memory bus. In some examples, the KMD may connect to be removable from the server 106 via intelligent drive electronics ("IDE"), serial advanced technology attachment ("SATA"), or another interface (e.g. SAS, NVMe, PCIe,). Further, the KMD 108 may be removed from a server and connected to another server with little to no modification. The KMD 108 may be connected or disconnected from the server 106 when the server 106 is powered off or while the server 106 is still powered on.

In some examples, the KMD 108 may be located outside of the server's 106 physical enclosure, and may be physically connected and disconnected from the server 106 via an external interface without physically modifying the server 106. For example, the KMD 108 can connect to be removable from the server 106 via a serial bus, such as IEEE 1394, or another interface. In some embodiments, the KMD 108 can be a memory device that can connect to the server 106 via a USB interface, external serial advanced technology attachment ("eSATA"), or other interface. When the KMD 108 is connected to the server 106 via an external interface, the user can physically insert the KMD 108 into the appropriate interface directly or with interface cables. The KMD 108 may receive power from the server 106, or may be powered with a separate power supply. To remove the KMD 108 from the server 106, a user may physically remove the KMD 108 from the corresponding interface in the server 106. The user can reconnect the KMD 108 to the server 106 or optionally connect the KMD 108 to another server.

Figure 2:
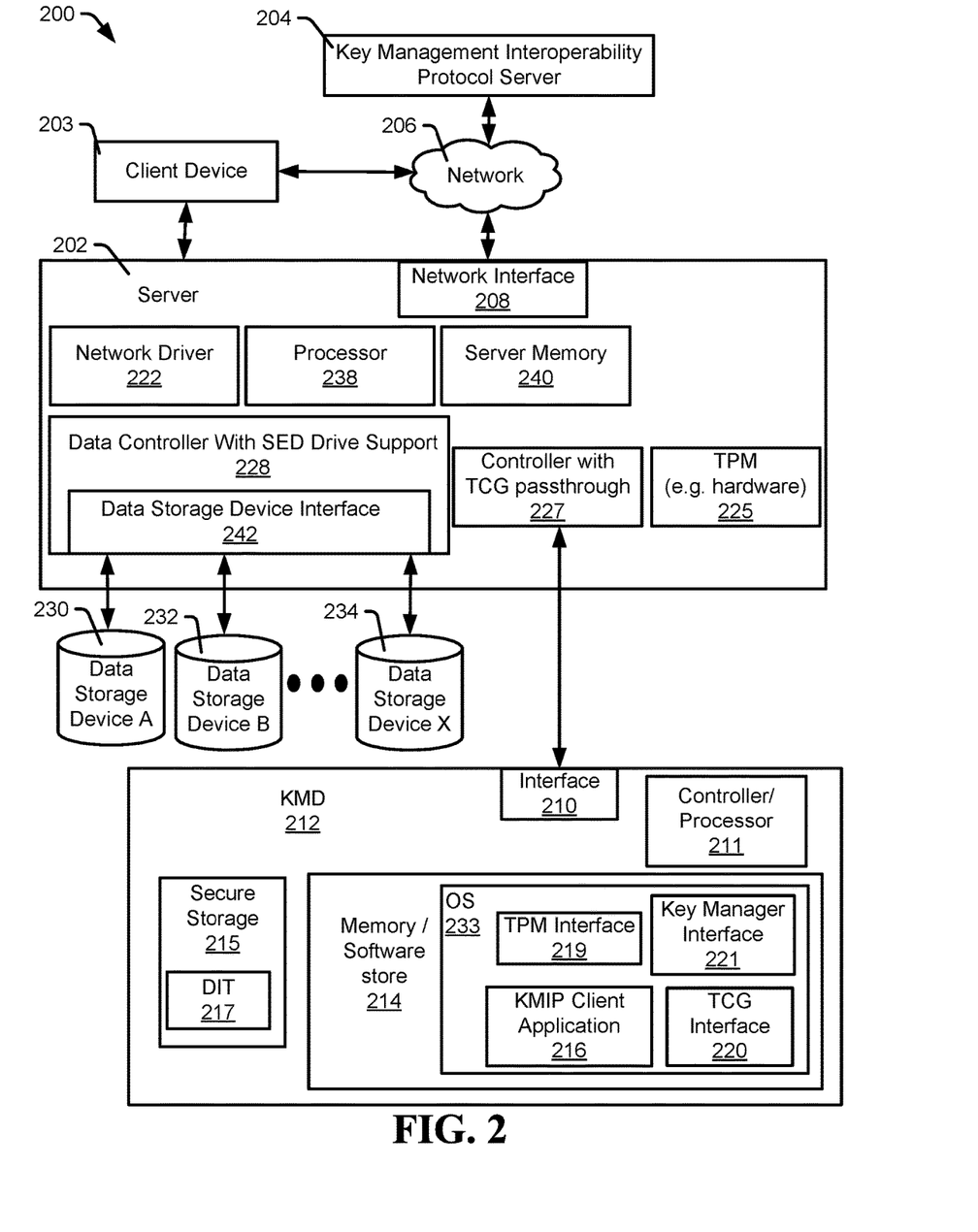
FIG. 2 is a diagram of a system of a removable circuit for unlocking self-encrypting data storage devices, in accordance with certain embodiments of the present disclosure.

Referring to FIG. 2, certain embodiments of a system of a removable circuit for unlocking self-encrypting data storage devices are shown and generally designated 200. The system 200 may be an example of the system 100, according to certain embodiments. The system 200 may have a KMIP 204 communicatively coupled to a server 202 via the network 206 and the network interface 208.

The server 202 may be coupled to DSD A 230, DSD B 232, and DSD X 234 via data controller 228. In some examples, DSDs A 230, B 232, and X 234 may be SEDs, and may be coupled to the data controller 228 via a DSD interface 242. The DSD interface 242 may be a serial-advanced-technology interface ("SATA"), serial-attached small-computer-system-interface ("SAS"), or other interface. The controller 228 may be a redundant array of independent discs ("RAID") controller or other data storage controller.

The server 202 can also include a server memory 240, network driver 222, processor 238, TPM 225, and a controller 227. In some examples, the processor 238 may be a circuit including one or more processing devices, such as central processing units, microprocessors, or other processors. The controller 227 may be a controller with a trusted computing group ("TCG") standardized passthrough protocols to allow the controller 227 to securely communicate with the KMD 212. In some examples, controller 227 and controller 228 may be combined into a single physical controller device.

The KMD 212 may be a removable data storage device, such as a hard disc drive (HDD) or solid state drive (SDD), connected to the server 202. The KMD 212 may include a non-secure data storage area 214 and a secure data storage area 215, both of which may be non-volatile memory, where secure data storage area 215 can be accessed via the TPM 225. The non-secure data storage area 214 may store an operating system ("OS") 233 that can be loaded into the server memory 240 for execution of the security protocols to unlock, register, or perform other functions on any SEDs connected to the server, or in communication with, the server 202. The OS 233 can be loaded into the memory 240 via the controller 211 providing the OS 233 to the controller 227 for loading into the memory 240.

The secure data storage area 215 can include a drive information table ("DIT") which can store information regarding SEDs managed by the security protocols of the server 202. The secure storage area 215 may be a reserved band or zone of the KMD 212 reserved to store authentication keys and other information corresponding to SEDs connected to the server 202. The secure storage area 215 may be encrypted and may only be accessible by the KMD 212 when the proper key is provided to the KMD 212 by the TPM 225.

Further, OS 233 can include code to implement security protocols or related functions, such as a key manager interface 221, a TCG interface 220, a KMIP client application 216, and a TPM interface 219. The TPM interface 219 can allow the OS 233 to communicate with the TPM 225, which can allow the OS 233 to unlock the secure storage area 215. The key manager interface 221 can allow the OS 233 to communicate with the KMIP server 204. The TCG interface 220 can allow the OS 233 to communicate with the KMD 212. The KMIP client application 216 can allow the OS 233 to communicate with a user of the server 202, a client device 203, or another server.

During operation, the server 202 may be powered on, and the BIOS of the server 202 can be configured to load the operating system 233 from the KMD 212 into the server memory 240 for execution by the processor 238. The operating system 233 can be loaded prior to a native operating system of the server 202 being loaded. Once the OS 233 is finished running its security protocols, such as to unlock or modify security of a band(s) or drive(s), the BIOS may load the native operating system which allows the server 202 to perform its normal functions. The BIOS code and the native operating system code may be stored in a non-volatile memory of the server 202.

Once the OS 233 is loaded into the server memory, the OS code can be executed to connect to the TPM to unlock the secure storage area 215 of the KMD 212. Access to the secure storage area 215 can be gained by utilizing the TPM 225 to generate an access key to unlock the secure storage area 225. Once access to the secure storage area 215 is granted by the TPM 225, the OS 233 may retrieve the DIT 217 and any unique certificates identifying the SEDs connected to the server 202. In some examples, the DIT 217 can include a list of DSDs connected (physically or communicatively) to the server 202 and can include a registration status (e.g. registered or unregistered) of each DSD, or other information corresponding to the DSD. Further, the DIT 217 can include a list of protected bands (e.g. zones) on one or more DSDs; and the functions herein can be performed per drive or per band. A protected band may be a reserved portion of the available storage in a DSD. Each DSD may have one or multiple bands for data storage. When referring to security locking or unlocking of SED DSDs herein, a band may be utilized instead of the whole drive.

Once the OS 233 has the DIT 217, the OS 233 can determine if any other drives or bands need to be added to the DIT 217. The OS 233 can also request an encrypted key from the KMIP server 204 to access the drives 230-234 or the bands listed in the DIT 217. The request to access the drives 230-234 or bands can include sending a unique certificate to the KMIP server 204 that corresponds to a specific item listed in the DIT 217; in response to a correct unique certificate arriving at the KMIP server 204, the KMIP server 204 can send a corresponding unique encrypted key back to the server 202. The OS 233 can then receive the encrypted key and unlock a corresponding drive or band utilizing the encrypted key. The OS 233 can then delete the local version of the encrypted key used. Once all the drives are unlocked, the OS 233 may relock the secure storage 215 via the TPM 225 and then hand over control of the server 202 to the BIOS to implement the native operating system.

In some embodiments, whenever an SED is connected or disconnected from the server 202, one or more unique indicators corresponding to the SED may be added or removed from the DIT 217. In some examples, the unique indicators may be manually added or removed from the list by a user, or may be automatically added or removed without any interaction with a user, or a combination thereof may be performed.

In some embodiments, the KMIP server 204 and the server 202 may be communicatively coupled using a cryptographic protocol, such as a secure sockets layer ("SSL") or transport layer security ("TLS"), which use certificates to provide security. A certificate may be a digital document that may include an encrypted key, issuing authority, server name and client name, and other information.

When one or more of the DSDs A 230, B 232, and X 234 have not been unlocked, the OS 233 may create an error indicator. In some cases, the OS 233 may create the error indicator when a threshold amount of time has passed since an encrypted key has been sent to a DSD, if a unlocked status indicator has not been received. The error indicator can be stored to a log file and can indicate which of the DSDs were not unlocked. The log file may be stored in the memory 214, server memory 240, secure storage 215, other memory, or any combination thereof.

In some examples, the KMD 212 can include one or more commands stored within the KMD 212 that can be loaded into the memory of the server 202 and run executed by the server 202; the commands could include commands to allow a user to add a drive or band or remove a drive or band from the. When a command of the KMD 212 is to be executed, the DIT 217 may be retrieved and compared to the actual physical configuration of the system 202, or any other system the KMD 212 manages, to verify the components of the system. The DIT 217 can be updated based on any changes to the system 202, or an error may be registered if any components cannot be verified. For example, the system can check for drive serial numbers, unique identifiers, encryption keys, or other information to detect if drives are in a different location or have been removed. In some cases, after OS 233 is closed after the KMD 212 setup is finished, the KMD 212 commands can be available to be executed via the server 202 while the server 202 is running the normal OS.

Figure 3:
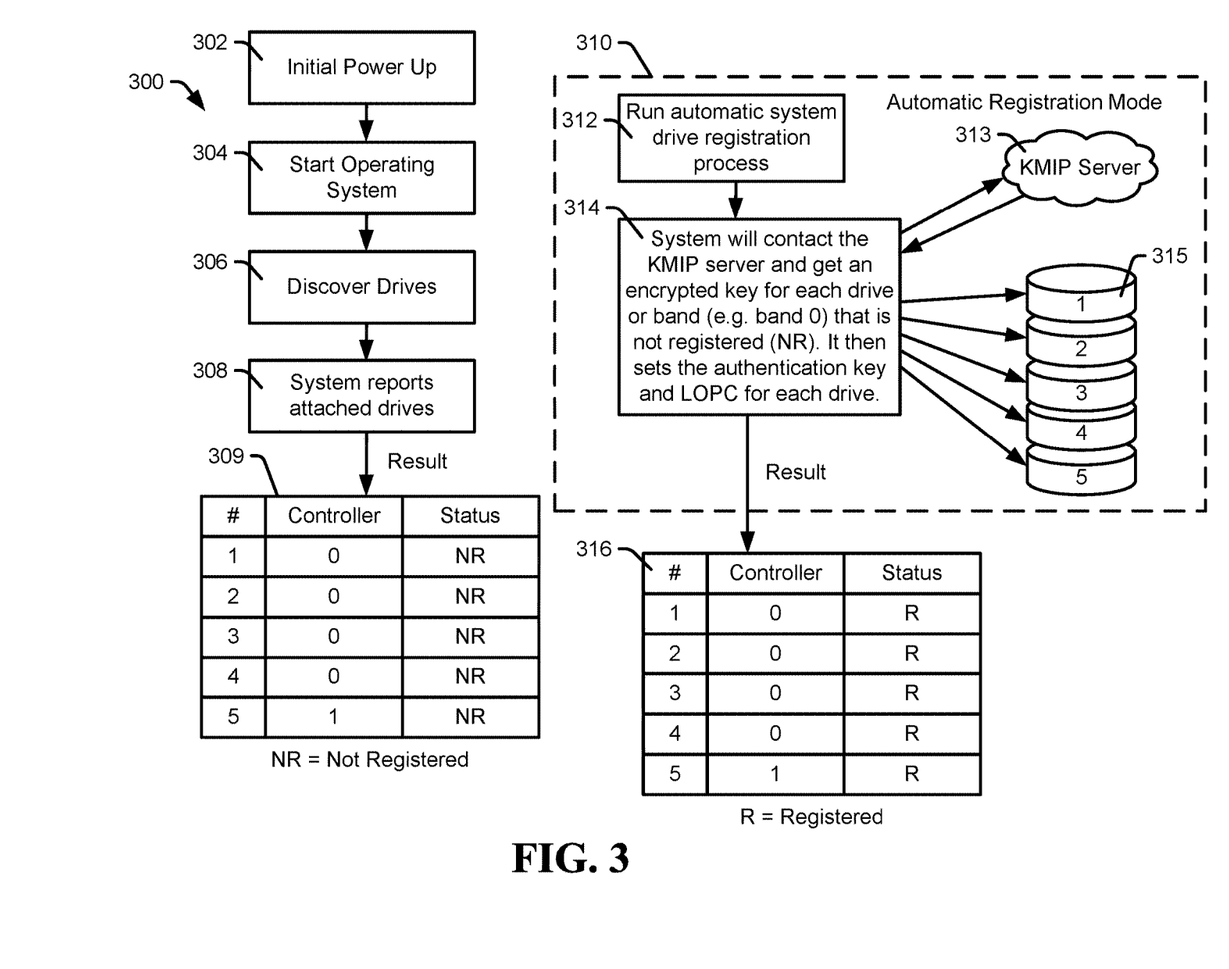
FIG. 3 is a flowchart of a method for unlocking self-encrypting data storage devices with a removable circuit, in accordance with certain embodiments of the present disclosure.

Referring to FIG. 3, certain embodiments of a method for unlocking self-encrypting data storage devices with a removable device are shown and generally designated 300. The method 300 may be implemented by the systems 100 and 200, according to certain embodiments. Generally, the method 300 is a general overview of how systems, such as systems 100 and 200, can register DSDs 315, or bands thereof, with a KMIP server 313.

The method 300 may start when a server is initially powered on, at 302. The server may load the operating system from the KMD to the server, at 304, and discover any SEDs or DSDs connected to the server, at 306. The OS may report the connected drives to the KMD, at 308. The KMD may store or update the results of the reported drives in a drive information table ("DIT") 309 that may indicate whether the connected drives are registered or not registered. The DIT and updates to the DIT may be stored or updated to the memory 215. The DIT 309 may also store other information, such as an indication of which server data storage controller a drive is associated with. If needed, the system can create the DIT 309 if one does not exist. The DIT is an internal table stored within the KMD.

If there are unregistered drives or bands, the server may implement an automatic registration mode, at 310, to perform an automatic drive registration process, at 312. The automatic registration mode may include the server system contacting the KMIP server 313 to receive a key for each drive or band in the DIT 309 that is not registered, at 314. The automatic registration mode may then install the corresponding authentication key and lock-on-power-cycle ("LOPC") setting(s) to each drive, at 314. The result of the automatic registration mode can be stored in DIT 309.

A LOPC setting can be a setting within each separate physical drive that indicates a drive is to be locked when a power cycle event occurs, such that once power is restored the drive is locked. The LOPC setting can be done per whole drive, per protected band/zone, or another configuration. Further, the unlocking processes discussed herein may be utilized for a per band unlocking process, where there can be multiple bands per drive.

Figure 4:
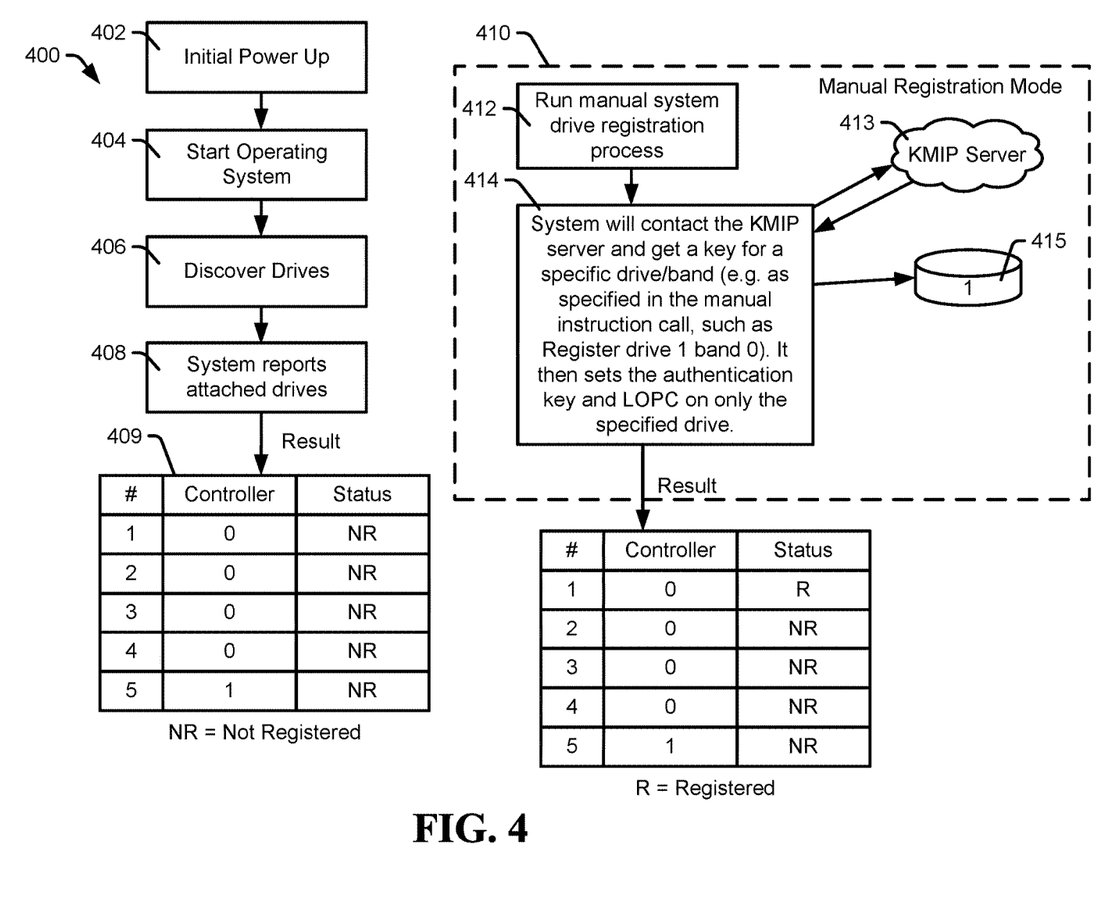
FIG. 4 is a flowchart of a method for unlocking self-encrypting data storage devices with a removable circuit, in accordance with certain embodiments of the present disclosure.

Referring to FIG. 4, certain embodiments of a method for unlocking self-encrypting data storage devices with a removable device are shown and generally designated 400. The method 400 may be implemented by the systems 100 and 200, according to certain embodiments. Generally, the method 400 is a general overview of how systems, such as systems 100 and 200, can register one or more DSDs 415, or bands, with a KMIP server 4313.

The method 400 may start when a server is initially powered on, at 402. The server may load the operating system from the KMD to the server, at 404, and discover any SEDs or DSDs connected to the server, at 406. The OS may report the connected drives to the KMD, at 408. The KMD may store or update the results of the reported drives in a drive information table ("DIT") 409 that may indicate whether the connected drives, or bands thereof, are registered or not registered. The DIT and updates to the DIT may be stored or updated to the memory 215. The DIT 409 may also store other information, such as an indication of which server data storage controller a drive is associated with. If needed, the system can create the DIT 409 if one does not exist.

If there are unregistered drives or bands, the server may implement a manual registration mode, at 410, to perform a manual drive registration process, at 412. The manual registration mode may be initiated by a user or client of the server indicating a specific unregistered DSD or band in the DIT 409 should be registered. The server system can then contact the KMIP server 413 to receive a key for the indicated drive or band, at 414. The manual registration mode may then install the corresponding authentication key and lock-on-power-cycle ("LOPC") setting(s) to the specific drive or band, at 414. The result of the manual registration mode can be stored in DIT 409.

Figure 5:
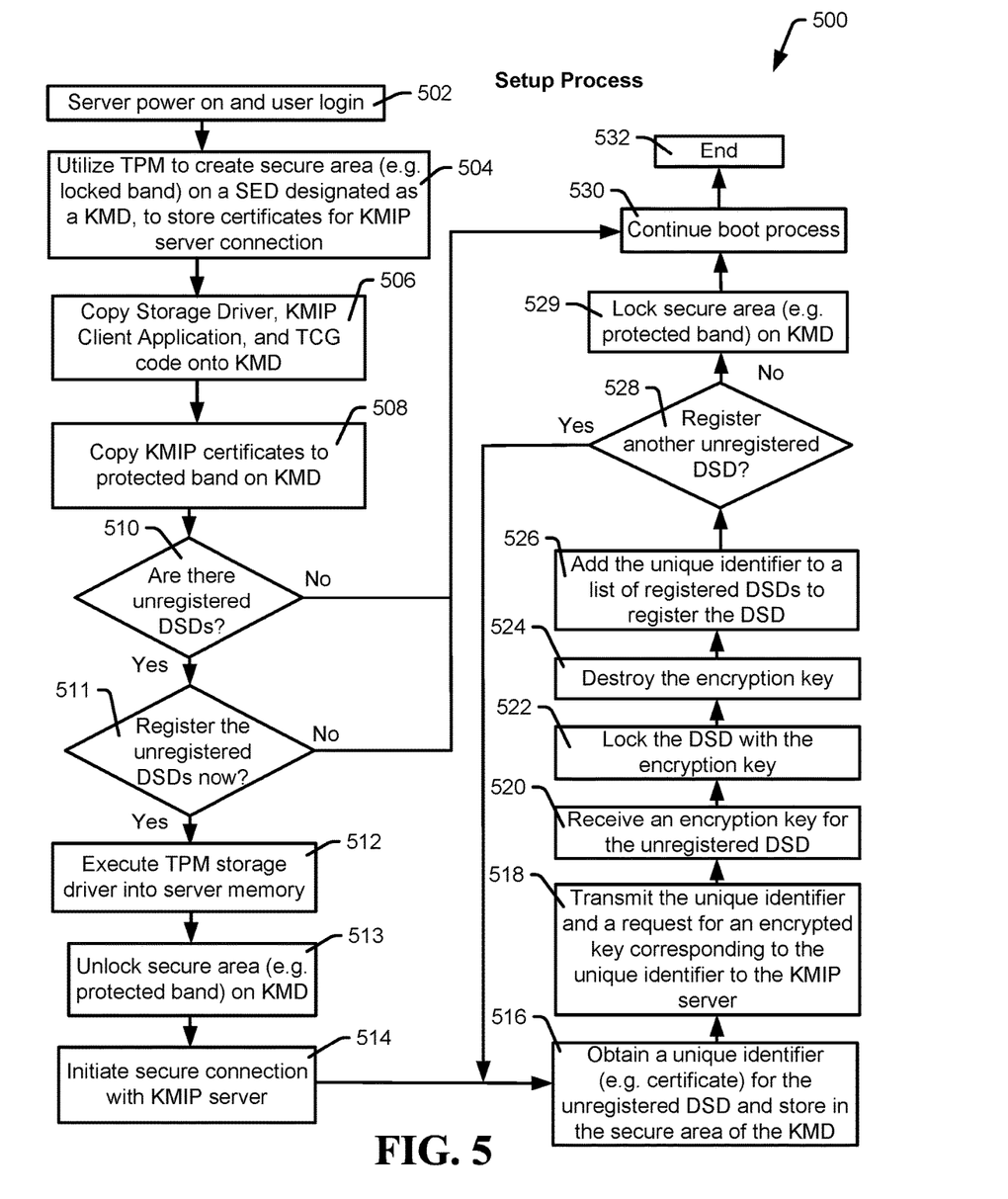
FIG. 5 is a flowchart of a method for unlocking self-encrypting data storage devices with a removable circuit, in accordance with certain embodiments of the present disclosure.

Referring to FIG. 5, certain embodiments of a method for unlocking self-encrypting data storage devices with a removable circuit are shown and generally designated 500. The method 500 may be implemented by the systems 100 and 200, according to certain embodiments. The method 500 can initialize systems 100 and 200 and register DSDs with a KMIP server.

The method 500 can start when a server is powered on, at 502. Once the server is running, the TPM may be utilized to create a secure storage area, such as a locked band, on a specific data storage device (e.g. SSD or HDD) designated as a KMD, at 504. The secure storage area can be utilized to store certificates to authenticate the DSDs connected to the server to the KMIP server.

The method 500 may include copying an OS and associated code for the TPM interface, the KMIP client application, the key manager interface, and the TCG interface onto the KMD, at 506. In some examples, the TPM interface, the KMIP client application, the key manager interface, or the TCG interface may be downloaded from a server via a network interface and stored to the KMD. When the OS code(s) are already on the KMD and no updates are to be made, step 506 may be bypassed.

Once the OS codes are stored in the KMD, certificates from the KMIP server can be stored in the secure storage area, at 508. Then, the method 500 can include determining if there are any unregistered DSDs or bands connected to the server, at 510. When there are no unregistered DSDs or bands in the table, the process may continue with the normal boot process, at 530, or can end at 532.

In some embodiments, unregistered DSDs or bands may be determined automatically by polling DSDs attached to the server and comparing their unique identifiers to a list of registered devices stored in a memory. When unique identifiers obtained from the DSDs are not in the list of registered devices, those DSDs or bands may be registered. In some cases, a user may determine that there are unregistered DSDs or bands coupled to the server. For example, when a user connects a DSD to the server via a DSD interface, the DSD, and bands thereof, may be unregistered.

When there are unregistered DSDs or bands attached to the server, the method 500 can include determining if any of the unregistered DSDs or bands should be registered, at 511. When one or more unregistered DSDs are to be registered, the method 500 can include loading a TPM storage interface into memory, at 512, and unlocking a secure area of the KMD that stores KMIP authentication certificates, at 513. Utilizing the OS and the KMIP authentication certificates, the method 500 can then initiate a secure connection with a KMIP server, at 514. The method 500 can also obtain a unique identifier (e.g. serial number, or other identifier) for the unregistered DSD and store the unique identifier in the secure storage area of the KMD, at 516. The KMD may send a command to the DSD requesting the unique identifier to obtain the unique identifier.

The method 500 can include transmitting the unique identifier and a request for an encrypted key corresponding to the unique identifier to the KMIP server, at 518. In some embodiments, the KMD may send one or more packets to the KMIP server via the secure connection. The packets may include the unique identifier, and a command instructing the KMIP server to create an encrypted key corresponding to the unique identifier. The KMIP server may create the encrypted key, and store the encrypted key and the unique identifier to a memory accessible to the KMIP server. The KMIP server can transmit the encrypted key back to the KMD. In some instances, the KMIP server may already have an existing encrypted key associated with a specific DSD or band and the KMIP server can return an existing encrypted key for the known DSD or band.

The method 500 can include receiving the encrypted key from the KMIP server, at 520. In some examples, the encrypted key may be received by the KMD, via the OS, and stored to a memory. Once the encrypted key has been received, the method 500 can include locking the DSD or band corresponding to the unique identifier with the encrypted key, at 522. In some embodiments, the KMD may send a TCG command and the encrypted key to the DSD with instructions to lock the DSD or band with the encrypted key. A TCG command may be a command that conforms to TCG protocols. The TCG command and the encrypted key can be transmitted to the DSD via a TCG interface. The command can include a request for an indicator to indicate if the lock operation was successful. If the lock operation was not successful, the command may be resent, aborted, or suspended pending action from the user. Also, an error message may be displayed and the error logged. The log can be stored to the KMD or another memory.

When the lock operation was successful, the local version of the encrypted key at the OS can be destroyed, at 524. For example, the encrypted key may be erased from the memory in which it was stored for access by the OS. The unique identifier may be added to a list of registered DSDs, such as a DIT, at 526. Once the unique identifier is added to the list of registered DSDs, the DSD can be considered registered and the successful lock operation can be store in the log.

The method 500 can include determining if there are other unregistered DSDs to register, at 528. This could be done automatically or done manually via user input. For example, unregistered DSDs may be determined automatically by polling DSDs attached to the server and comparing their unique identifiers to a list of registered devices stored in a memory. When there are more unregistered DSDs to register, the method 500 can repeat steps starting at 516. When there are no more unregistered DSDs to register, the method 500 can include locking the secure storage area, at 529. Then, the method 500 may continue the boot process, at 530. In some examples, the boot process may include detecting or initializing other hardware components, loading applications into a memory, loading a native operating system into memory, other tasks, or any combination thereof. The method 500 can end, at 532.

One or more steps in the method 500 may be optional. For example, in certain embodiments, the steps 508 and 510 may be removed. Further, some ordering in which the steps are executed in the method 500 may be changed.

Figure 6:
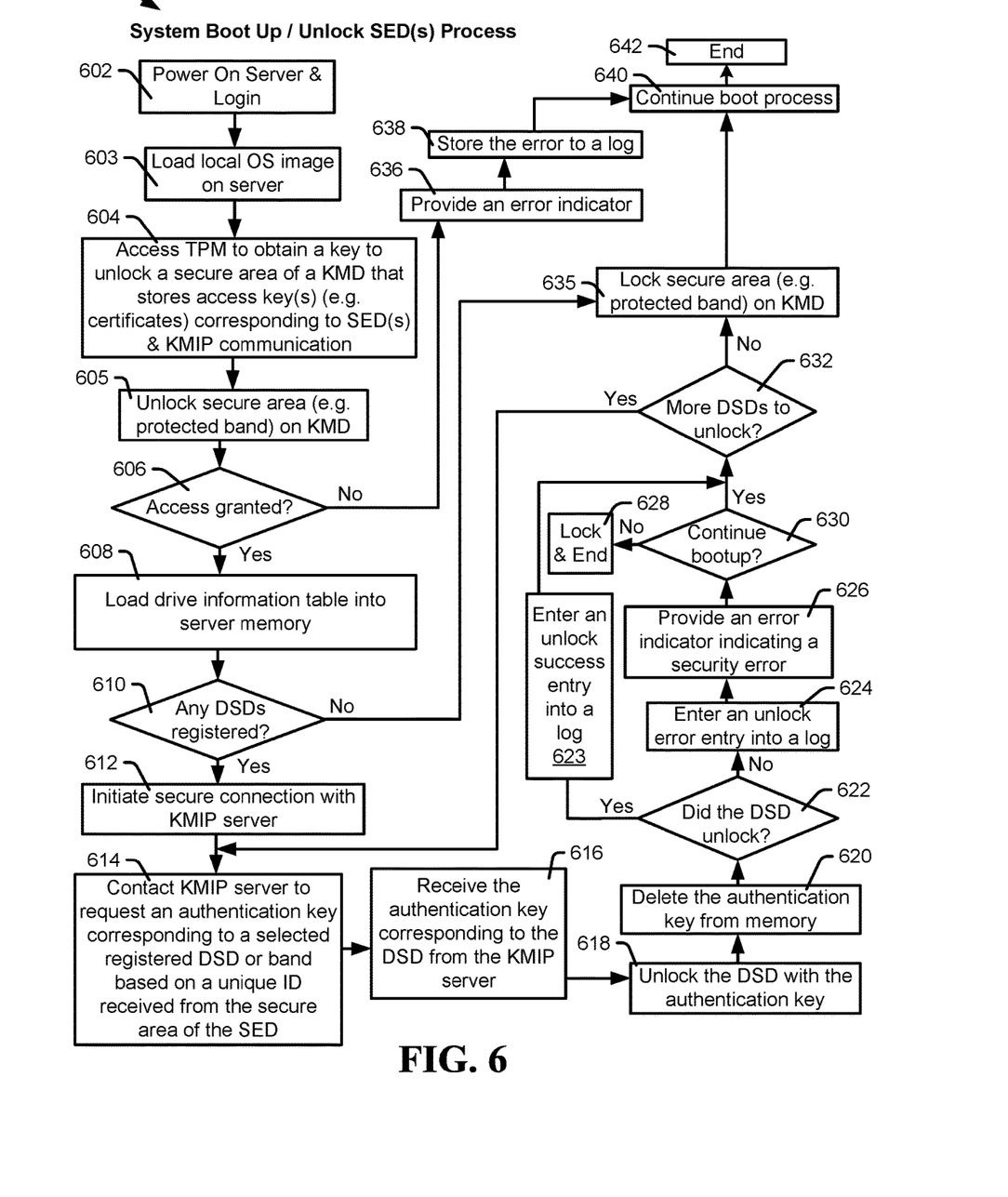
FIG. 6 is a flowchart of a method for unlocking self-encrypting data storage devices with a removable circuit, in accordance with certain embodiments of the present disclosure.

Referring to FIG. 6, certain embodiments of a method for unlocking self-encrypting data storage devices with a removable circuit are shown and generally designated 600. The method 600 may be implemented by the systems 100 and 200, according to certain embodiments. The method 600 can unlock DSDs using encrypted keys obtained from a key management server.

The method 600 can include powering on a server, at 602, and having the server's BIOS load a special operating system ("OS") into memory of the server, at 603. The special OS may be configured to perform the security functions and communications herein and may be stored on a KMD. The method 600 may also include accessing a TPM within the server to obtain a key to unlock a secure area of the KMD that stores access key(s) (e.g. certificates) corresponding to SED(s), at 604. The secure area of the KMD may also store information to establish a secure connection with the KMIP server. Once the OS has access to TPM, the OS may utilize the TPM to unlock the secure area on the KMD, at 605. If the TPM does not grant access to the secure area, the process may provide an error indicator, at 636, store the error to a log file, at 638, and may continue the boot process without unlocking any SEDs, at 640.

When access to the secure area of the KMD is granted, the OS may load the drive information table ("DIT") into the server memory, at 608, and the OS can determine if there are any DSDs or bands registered in the DIT, at 610. In some cases, unique identifiers obtained from connected DSDs can be compared against the list of registered DSDs to determine if there are any DSDs or bands in the DIT. If there are no DSDs registered in the DIT, the process may relock the secure area of the KMD, at 635, and may continue with the boot process without unlocking any SEDs, at 640. However, if there are DSDs registered in the DIT, the process may continue.

When at least one of the unique identifiers obtained from the DSDs coupled to the server corresponds to a unique identifier in the list of registered DSDs, a secure connection with a KMIP server can be initiated by the OS, at 612. Once a secure connection with a KMIP server has been established, the method 600 can include requesting a security key (e.g. encrypted key) corresponding to a selected registered DSD or band, at 614, by its unique stored ID.

The method 600 can include receiving the encrypted key corresponding to the selected unique identifier from the KMIP server, at 616. When the encrypted key is received from the KMIP server via the secure connection, the encrypted key may be stored to a memory. If the encrypted key is not received from the KMIP server, a DSD corresponding to the encrypted key will not be unlocked, and an error message can be reported or logged.

The registered DSD or band corresponding to the encrypted key and the selected unique identifier may be unlocked by the encrypted key, at 618. The OS may also delete the local version of the encrypted key from the memory, at 620. In some embodiments, an area of the memory in which the encrypted key was stored may be overwritten with data patterns, such as a pattern of 0's or 1's, to erase the security key from the memory. Further, other secure ways of deleting an encrypted key may be utilized.

The method 600 can include determining if the DSD was successfully unlocked, at 622. In some examples, the OS can determine if the DSD was successfully unlocked based on the DSD's response to the unlock command. For example, a DSD can transmit a successful return indicator to the OS when the unlock command was successfully executed, and a non-successful return indicator to the OS when the unlock command was not successfully executed.

The success or failure of each DSD to unlock may be logged. For example, when the DSD was successfully unlocked, an entry indicating the DSD was successfully unlocked may be entered into a log, at 623, and the method 600 can include determining if there are more DSDs to unlock, at 632. In some embodiments, the log may be stored in the KMD, in a server memory, in a portable memory, in another memory, or any combination thereof. When the DSD was not successfully unlocked, the method 600 can include entering an entry indicating the DSD was not successfully unlocked into a log of errors, at 624, and providing an error indicator indicating a security error, at 626.

In some embodiments, the method 600 may include providing the OS or a user with an option to stop the server's bootup process in response to a security error, at 630. When the process is elected to be stopped, the bootup process and the method 600 can end, at 628. In some examples, the user may not be provided with an option to continue or stop the bootup process, at 630; rather, the method 600 may automatically end, at 628, determine if there are other DSDs to unlock, at 632, or perform other operations. If the bootup process is ended, at 628, the method 600 can also lock the secure area on the KMD, at 628.

When the bootup process continues, the method 600 can include determining if there are any other registered DSDs or bands to unlock, at 632. In some embodiments, the OS can compare the unique identifiers obtained from the attached DSDs against a list of registered DSDs. If another of the unique identifiers obtained from the attached DSDs corresponds to a unique identifier from the list of registered DSDs, a request for an encrypted key corresponding to another selected unique identifier may be transmitted to a KMIP server, at 614, and the process can continue as described above. Further, the OS can determine when there are no more registered DSDs to unlock by requesting a registration status, an encrypted status, or both, from the attached DSDs. For example, a command may be sent to each of the attached DSDs to determine if any of the DSDs are still locked, or do not correspond to any unique identifier in the list of registered DSDs.

When all of the DSDs are unlocked, the method 600 can lock the secure area on the KMD, at 635, and proceed to continue a boot process, at 640. When some of the DSDs are still locked or are not in the list of registered DSDs, the method 600 can lock the secure area of the KMD, at 635, and then continue with the boot process, at 640.

In some systems, multiple encrypted keys may be obtained from a KMIP server at a time. For example, multiple unique identifies from the list of registered DSDs may be transmitted to the KMIP server in a single request for encrypted keys, and the KMIP server may transmit corresponding encrypted keys in a single response.

In some embodiments, an order in which the steps in the method 600 may be changed. For example, in certain embodiments, operation 626 may occur prior to operation 624, or operation 620 may occur after operation 622.

Figure 7:
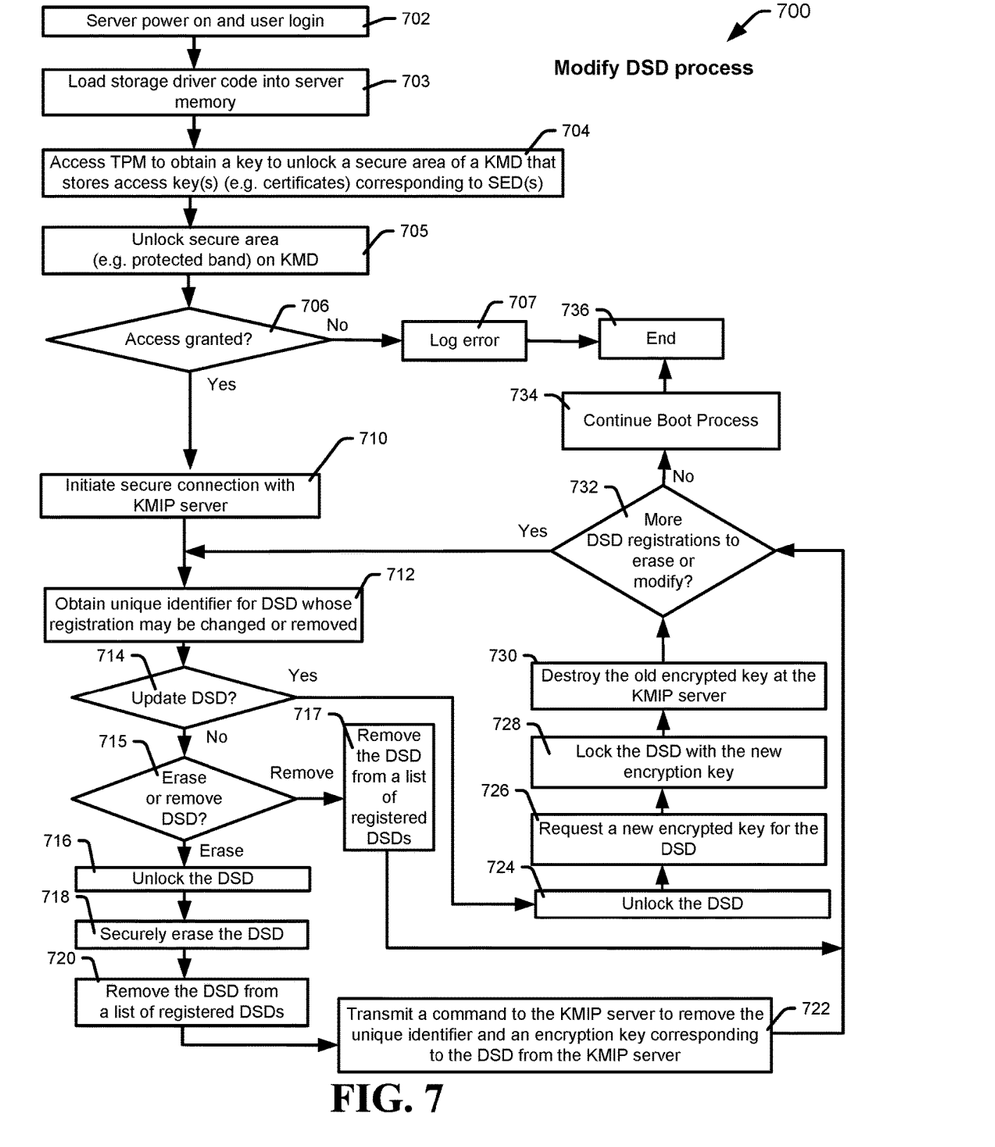
FIG. 7 is a flowchart of a method for unlocking self-encrypting data storage devices with a removable circuit, in accordance with certain embodiments of the present disclosure.

Referring to FIG. 7, certain embodiments of a method for unlocking self-encrypting data storage devices with a removable circuit are shown and generally designated 700. The method 700 may be implemented by the systems 100 and 200, according to certain embodiments. The method 700 can delete or modify DSD registration.

The method 700 can include powering on a server, at 702, and loading storage driver code, such as an operating system, into the server's memory, at 703. In some embodiments, a modified OS stored within a KMD can be loaded to run on the server and perform security operations to allow the KMD and server to perform the functions herein. The OS can interface with a TPM to provide access to a secure storage area of a KMD by obtaining a key to unlock the secure area, at 704, which can stores key(s) (e.g. certificates) corresponding to SED(s). The method can attempt to unlock the secure area via the TPM, at 705, and determine if access was granted, at 706. If access was not granted, the method may log an error, at 707, and stop, at 736.

If access was granted, the method may initiate a secure connection with a KMIP server, at 710. The method may also obtain an unique identifier for a DSD whose registration may be changed or removed, at 712. In some examples, the KMD or other memory may include a list of DSDs to be unregistered and a list of DSDs whose registration may be changed or updated, and the KMD can select the unique identifier from the lists. The KMD can compare a DSD's unique identifier against a list of DSDs to be unregistered and a list of DSDs whose registration may change or need updating.

The method 700 can include determining if the selected DSD may be updated, at 714. When the selected DSD is to be updated, the method may unlock the DSD, at 724, request a new encrypted key for the DSD, such as from a KMIP server, at 726, receive and lock the DSD with the new encrypted key, at 728, and destroy the old encrypted key at the KMIP server, at 730. The method may then determine if more DSDs need erasing or updating, at 732. When there are no more DSD registrations to change or remove, the method 700 can include continuing the boot process, at 734, and ending, at 736.

The method 700 can include determining if the DSD to be unregistered can be erased, at 715. In some circumstances, a DSD can be removed without securely erasing the data. In some examples, an erase indicator corresponding to the DSD may be included in the list of DSDs. When the DSD is to be removed (and not erased), the method 700 can include removing the DSD from a list of registered DSDs, at 717, and determining if there are more DSD registrations to erase or modify, at 732.

When the DSD is to be erased, the method 700 can include unlocking the DSD, at 716. The method 700 can include securely erasing the unlocked DSD, at 718. In some embodiments, the DSD may be cryptographically erased. When a DSD is cryptographically erased, an encryption key protecting data of the DSD may be changed, and all record of the encryption key may be destroyed. Thus, any data encrypted by such key on the DSD may not be accessible. In some examples, the DSD may be physically erased using write patterns to continually overwrite the DSD, or a portion thereof, until no physical traces of useful data exist.

Once the DSD has been securely erased, the method 700 can include removing the DSD from a list of registered DSDs, at 720. The list of registered DSDs may be accessed and the unique identifier corresponding to the securely erased DSD may be removed.

The method 700 can then include transmitting a command to the KMIP server to remove (e.g. delete, erase) the unique identifier and the encrypted key corresponding to the DSD from the KMIP server, at 722. The KMIP server may transmit a response to the KMD to indicate if the unique identifier and corresponding key were successfully erased.

The method 700 can include determining if there are more DSDs to be unregistered or DSDs whose registration may be changed, at 732. The method may determine if there are any more DSDs in the list of DSDs to unregister and the list of DSDs whose registration may be changed to determine if there are DSDs that have not yet been selected. When there are no more DSD registrations to change or DSDs to erase or remove, the method 700 can include continuing a boot process, at 734, and ending, at 736.

When there are more DSD registrations to change or DSDs to update, erase, or remove, the method 700 may repeat one or more of the steps.

One or more steps in the method 700 may be optional. Further, in some examples, an order in which steps in the method 700 are executed may change. For example, step 722 may be executed before step 720.

Figure 8:
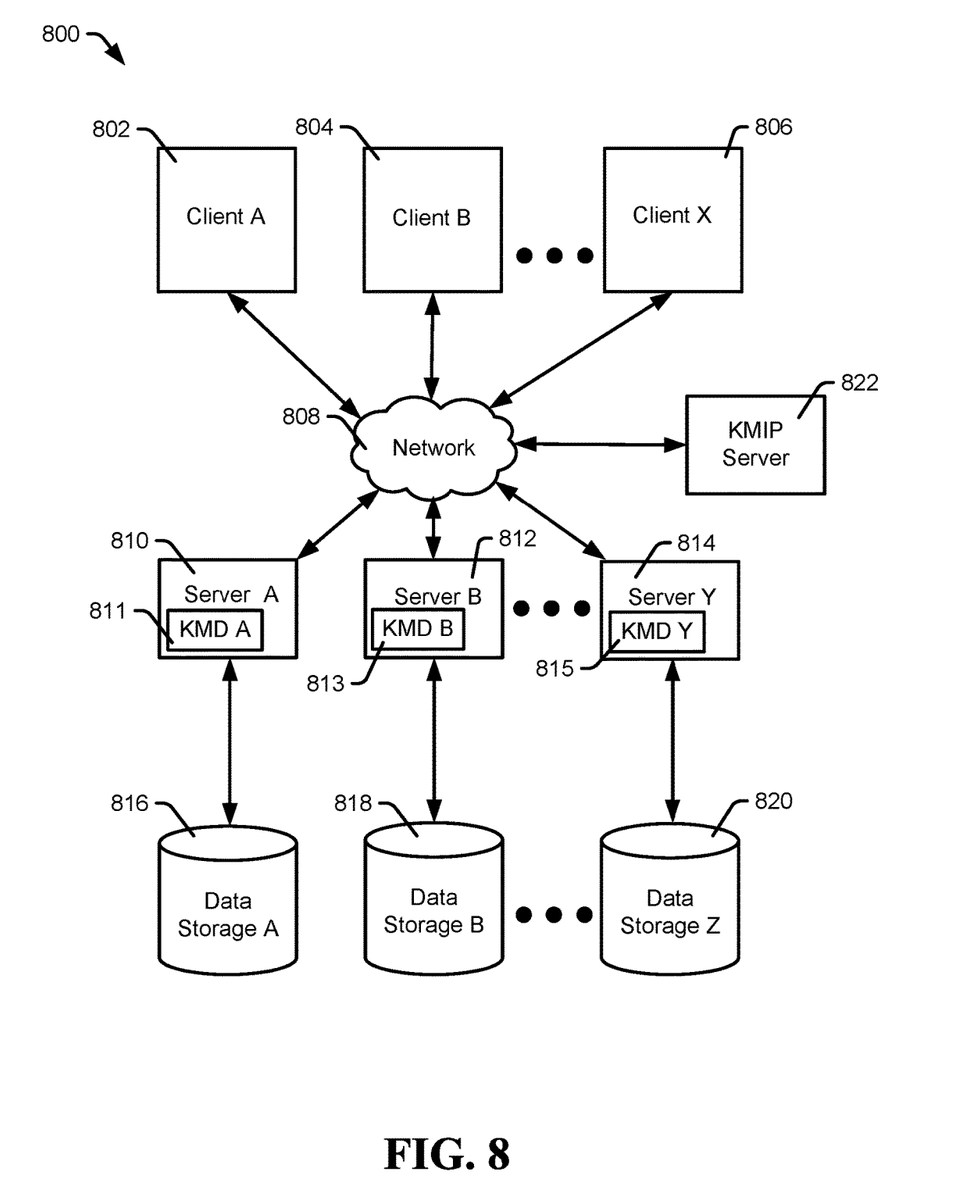
FIG. 8 is a diagram of a system of a removable circuit for unlocking self-encrypting data storage devices, in accordance with certain embodiments of the present disclosure.

Referring to FIG. 8, certain embodiments of a system of a removable circuit for unlocking self-encrypting data storage devices are shown and generally designated 800. The system 800 may be an example of the systems 100 and 200, according to certain embodiments. The system 800 may be an example of a distributed file system with a KMIP server, and may implement systems 100 and 200, and methods 300, 400, 500, 600, and 700, according to certain embodiments.

The distributed file system can allow one or more client nodes (e.g. A 802, B 804, and X 806) to access data in arrays of data storage (e.g. A 816, B 818, and Y 820) via a network 808. Servers A 810, B 812, and Y 814 can include KMDs A 811, B 813, and Y 815 may be coupled to the arrays of data storage A 816, B 818, and Z 820, respectively. In some examples, servers A 810, B 812, and Y 814 may store data to, or obtain data from, the arrays of data storage A 816, B 818, and Z 820 in response to client requests.

In some embodiments, the servers A 810, B 812, and Y 814, may be coupled to a KMIP server 822 via the network 808. When the servers A 810, B 812, and Y 814 power up, KMDs A 811, B 813, and Y 815 may transmit a request for keys corresponding to the DSDs in data storage A 816, B 818, and Z 820, to the KMIP server 822. In some examples, the KMD 811 in a server A 810 may be communicatively coupled to data storage 818, and the KMD 811 can manage the certificates and access of data storage 818.

In some examples, when the clients A 802, B 804, or X 806, want to store or obtain data, a file system operation request may be transmitted to one or more of the servers A 810, B 812, and Y 814 via the network 808. The servers A 810, B 812, and Y 814 may store all or part of the data to their corresponding data arrays of storage.

In some cases, servers A 810, B 812, and Y 814 may be file system servers, metadata servers, or other servers.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a key data storage device ("DSD") configured to:
connect to be removable from a first server;
load an operating system stored locally in the key DSD into the memory of the first server, the operating system configured to:
transmit, from the first server to a second server, a request for a key corresponding to an encrypted DSD, the request including an authentication certificate;
receive the key from the second server;
unlock a secure storage area of the encrypted DSD with the key;
determine if there is an unregistered DSD coupled to the first server, where an unregistered DSD is another DSD that does not have a corresponding key stored in the second server;
obtain a unique identifier from the unregistered DSD;
provide the unique identifier and a request for another corresponding key to the second server;
receive the other corresponding key from the second server; and
lock the unregistered DSD with the other corresponding key.

2. The apparatus of claim 1 further comprising:
the operating system configured to:
determine a unique identifier corresponding to the encrypted DSD;

provide the unique identifier and the request for the key corresponding to the encrypted DSD to the second server; and receive the key from the second server and provide the key to the encrypted DSD to unlock the encrypted DSD.

3. The apparatus of claim 2 further comprising:
the key DSD configured to:
connect to be removable from the first server by a physical and electrical connection to the first server which allows the key DSD to be removed from the first server without physically modifying the first server.

4. The apparatus of claim 1 further comprising:
the operating system configured to:
access an encrypted hardware module of the first server;
obtain access to a secure data storage area of the key DSD via the encrypted hardware module; and
retrieve the authentication certificate from the secure data storage area when access is granted to the operating system.

5. The apparatus of claim 1 further comprising:
the operating system configured to:
determine if there is a registered DSD to be unregistered coupled to the first server;
obtain another unique identifier from the registered DSD to be unregistered;
provide the other unique identifier and a request for a third key to the second server;
receive the third key from the second server;
unlock the registered DSD to be unregistered with the third key to unregister the registered DSD;
erase the unregistered DSD; and
transmit a command to the second server to remove the other unique identifier and the third key from the second server.

6. The apparatus of claim 1 further comprising:
the operating system configured to:
determine if there is a DSD registration to modify corresponding to a another DSD coupled to the first server;
obtain another unique identifier from the other DSD;
provide the other unique identifier and a request for a third key to the second server;
receive the third key from the second server;
unlock the other DSD with the third key;
provide the other unique identifier and a request for a fourth key to the second server;
receive the fourth key from the second server; and
lock the other DSD with the fourth key.

7. A system comprising:
a key data storage device ("DSD") configured to be connectable and removable from a first server, the key DSD including:
an interface circuit;
a secure nonvolatile data storage area;
a memory storing a key management operating system;
a controller configured to:
load the key management operating system into the memory of the first server, the key management operating system configured to:
access a hardware encryption circuit of the first server;
obtain access to the secure nonvolatile data storage area of the key DSD via the hardware encryption circuit;
retrieve an authentication certificate from the secure nonvolatile data storage area when access is granted to the key management operating system;
transmit, from the first server to a second server, a request for a key corresponding to an encrypted DSD connected to the first server, the request including the authentication certificate;
receive the key from the second server; and
unlock the encrypted DSD with the key; and
a drive information table stored within the secure nonvolatile data storage area, the drive information table identifying whether encrypted data storage devices connected to the first server have keys registered with the second server.

8. The system of claim 7 further comprising:
the system includes the first server coupled to the key DSD;
the hardware encryption circuit includes a cryptographic integrated circuit within the first server that is not within the key DSD;
an array of encrypted data storage devices within the first server; and
a memory within the first server storing a native operating system configured to operate the first server, the native operating system different than the key management operating system.

9. The system of claim 8 further comprising each encrypted data storage device of the array of encrypted data storage devices includes a setting to activate a lock-on-power-cycle feature which forces a drive to become locked if there is an unexpected power event.

10. The system of claim 7 further comprising:
the operating system configured to:
determine if the encrypted DSD has been unlocked; and
provide an error indicator when the encrypted DSD has not been unlocked.

11. The system of claim 7 further comprising the operating system configured to establish a secure communication channel between the first server and the second server.

12. The system of claim 7 further comprising:
the operating system configured to:
implement an automatic drive registration mode whereby each unregistered encrypted data storage device connected to the first server that is not registered and does not have a corresponding authentication certificate and key at the second server is automatically determined;
automatically send a request to the second server to register any unregistered encrypted data storage devices;
receive a key from the second server corresponding to each unregistered encrypted data storage device;
lock each unregistered encrypted data storage device with each unregistered encrypted data storage device's corresponding key received from the second server; and
update the drive information table to indicate each locked encrypted data storage device is registered.

13. The system of claim 7 further comprising:
the operating system configured to:
implement a manual drive registration mode whereby a user can submit a command to the operating system to have an unregistered encrypted data storage device that is not registered and does not have a corresponding authentication certificate and key at the second server manually registered.

14. The system of claim 7 further comprising:
the key DSD is configured to be connected and removed from the first server while the first server is powered on.

15. The system of claim 7 further comprising:
the key DSD is located outside of the first server; and
the key DSD is physically connected and disconnected from the first server via an external interface without physically modifying the first server.

16. A memory device storing instructions that when executed cause a processor to perform a method comprising:
accessing a hardware encryption circuit of a first server;
obtaining access to a secure nonvolatile data storage area of a first data storage device via the hardware encryption circuit;
retrieving an authentication certificate from the secure nonvolatile data storage area when access is granted;
transmitting, from the first server to a second server, a request for a key corresponding to a second data storage device connected to the first server, the request including the authentication certificate;
receiving the key from the second server; and
unlocking the second data storage device with the key; and
the method further including implementing an automatic registration mode when a data storage device is detected that does not have a key registered with the second server.

17. The memory device of claim 16 further comprising the method including retrieving a drive information table stored within the secure nonvolatile data storage area, the drive information table identifying whether data storage devices have keys registered with the second server.

* * * * *